March 22, 1960 — R. E. STEVENS — 2,929,354
PIPE LINE MILKING SYSTEM
Filed Oct. 15, 1956 — 2 Sheets-Sheet 1

INVENTOR:
Rowland E. Stevens
BY John P. Murphy
Attorney.

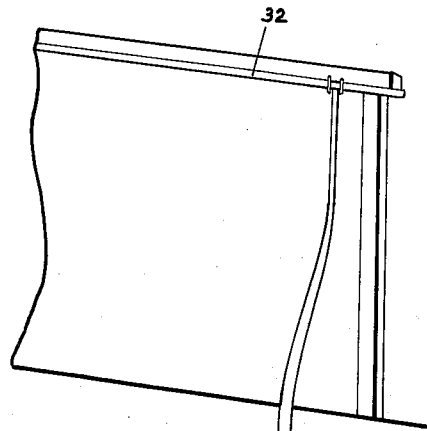
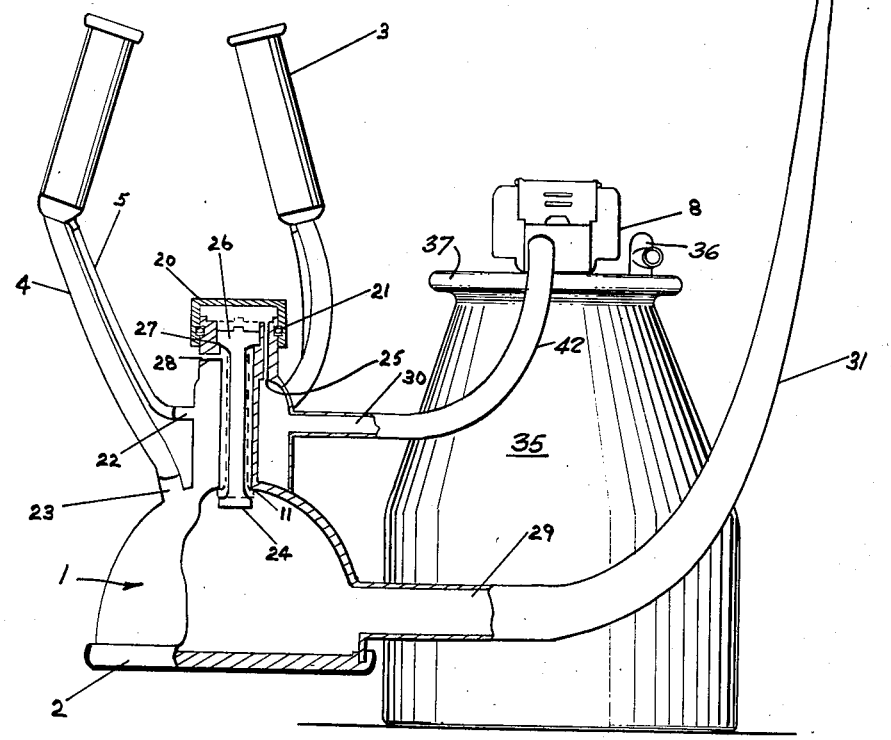

| United States Patent Office | 2,929,354 |
|---|---|
| | Patented Mar. 22, 1960 |

2,929,354
PIPE LINE MILKING SYSTEM

Rowland E. Stevens, Sherrill, N.Y., assignor to Conde Milking Machine Company, Inc., Sherrill, N.Y., a corporation of New York Application October 15, 1956, Serial No. 615,826

5 Claims. (Cl. 119—14.54)

The present invention relates to a novel and improved claw for milking machines, and in particular to a claw which aids the movement of the milk from the claw through a conduit to the ultimate receptacle.

It has been reported, that in the past, by using pipeline milkers, the resulting rancidity of the milk in the lines presented a grave problem. The main problem lies with pipeline milkers using vertical sections of pipe in the line and located at a higher elevation than that of the cow's udders. The milk, enroute from the udder through the claw, frequently "bounces" in the vertical tube, or in the vertical risers before being carried along the horizontal line. As a result, the excessive agitation of the warm, raw milk stimulated enzymatic action that caused fat to become rancid. As can be readily understood, this is a very unfavorable condition. It has been a problem to move the milk from the claw to the ultimate receptacle by a machine milker without disturbing the efficiency of the milking procedure.

The normal displacement resulting from the collapse of the inflations is not sufficient to move the milk from the milk claw through a tube to an elevated pipe, or receptacle. Attempts have been made to solve this problem by admitting air or atmospheric pressure into the claw in order to increase the pressure on the milk and move it more rapidly through the connecting tube to the elevated pipeline or receptacle. Such methods succeeded in moving the milk through the connecting tube, but at the same time impaired the efficiency of the milking machine for the reason that it admitted air to the claw at the milking stage of the milking machine cycle which unduly reduced the vacuum exerted on the cow's teat and disturbed the normal milking environment of the teat with respect to vacuum.

It is an object of the present invention to provide a milk claw used in pipeline milkers that will reduce the agitation of the milk from the milk claw up into the pipeline and provide a smoother flow of milk, thus preventing the possibility of rancidity occurring throughout the pipeline, including vertical tubes, or risers.

Another object of the present invention is the provision of a milk claw that may be used with a pulsator, as in the L. T. Conde, Patent No. 2,675,821, which permits normal milking regardless of the height of the vertical pipeline with respect to the udders.

Still another object of this novel milk claw is to provide a means for forcing the milk smoothly and evenly into the pipelines without backtracking and flooding up into the teat cups. The teats are thus kept drier, and no abnormal pressure is exerted inside the inflation members.

Another advantage of this milk claw is its construction which enables one to control the amount of air pressure admitted into the milk by means of an opening located therein which may be varied in size, as desired.

Another advantage of the present invention is that the air is admitted at the exact time that the inflation member is squeezed, hence there is no interference with the actual milking stage of the milking cycle.

Still another object of this invention is to provide a milk claw that will not interfere in the normal vacuum produced in the teat cups during the milking cycle, thus maintaining the normal vacuum at all times, which is very desirable.

Due to its construction, this novel milk claw may be easily connected to the teat cups, pulsator and pipelines; may be easily cleaned after the milking procedure, and is automatically operated by the action of the connected pulsator controlling the differential pressures applied to the teat cups.

Other valuable objects and advantages will become more apparent from the following description and arrangement of parts of one embodiment of the present invention.

In accordance with the present invention, a milk claw is provided having a milk outlet, tubular air hose receiving adapters, tubes to facilitate the connection of the teat cups to the milk claw, and a piston regulating the admission of air into the milk claw, and forcing the milk out into the pipeline by means of atmospheric pressure which is regulated by the action of the pulsator connected to the milk claw by suitable means.

During the milking cycle, when the inflation member is squeezed against the teat by the presence of atmospheric pressure between the metal shell and the inflation member, that is when no vacuum exists, the air pressure forces the piston located in the milk claw into the open position, thus allowing the entrance of air into the chamber of the milk claw containing the milk received from the teat. The milk located in the claw chamber is thus forced up into the elevated pipeline by means of the additional atmospheric pressure admitted to the milk claw. This is due to the fact that, the piston being closed and milk flowing into and through the pipeline, a partial vacuum is created in the chamber. Thus, when the piston is opened, additional atmospheric pressure is applied in the chamber, forcing milk therein into the pipeline.

Through the action of the pulsator connected to the milk claw, a vacuum is produced, the vacuum being of a lower pressure than that of the atmosphere, thus lifting the piston which closes the entrance of air into the milk claw. So it is seen, that when the pulsator creates a vacuum, the cow is milking; the piston is held up in a closed position letting no air into the milk claw and at the same time preventing any milk from re-entering the teat cups from the milk claw.

As a result, during the normal cycle of milking procedure, through the alternate application of vacuum by means of the pulsator and the milk claw, and through the corresponding rise and fall of the piston with respect to the atmospheric pressure, the milk located therein is forced out into the pipeline when the cow is not milked. This even regulation of forcing the milk from the claw, out into the pipeline, prevents any opportunity for enzymatic action causing fat to become rancid, and prevents the milk, retained in the milk claw when not being forced out into the pipeline, from flowing back into the teat cups.

In the drawings:

Figure 3 is a slightly enlarged operative elevational view with portions broken away of the milk claw with respect to the teat cups on a cow, the pulsator and a vertical milk conduit, the pulsator being mounted on the cover of a conventional milk pail.

Figure 1:
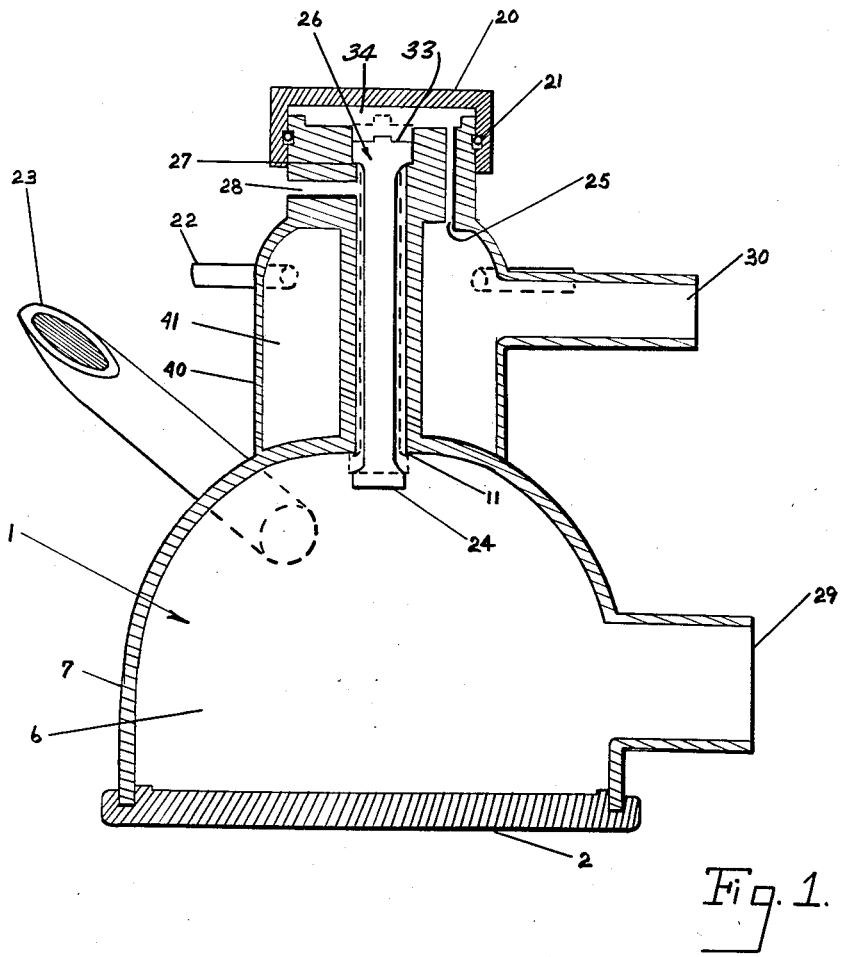
Figure 1 is an enlarged sectional view illustrating the operative parts and structure of one embodiment of this invention, taken on line 1—1 in Figure 2.
Figure 2:
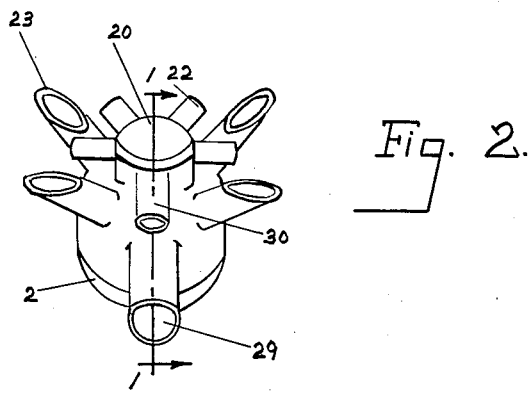
Figure 2 is a perspective view of the milk claw illustrating the exterior position of the milk outlet, pulsator inlet, milk tube nipples, air tubes and the bottom cover for the milk claw.

Referring now to the accompanying drawings in detail, the invention consists of a milk claw which is designated as a whole by the reference character 1. The milk claw 1 embodies in its construction a substantially cylindrical body 7 forming a chamber 6, the lower end of which may be plugged by a suitable cover 2, as best seen in Figure 1. Extending outward from the body 7 of the milk claw 1 is a milk outlet 29 connecting the chamber 6 with the pipeline 32 by suitable means, such as a milk hose 31, as illustrated in Figure 3. If desired, the milk outlet 29 may be connected to a milk pail 35, or any other receptacle used for receiving milk. This pail 35 can be any conventional dairy pail having for instance a cover 37 and a milk tube connection 36 adapted to receive hose 31.

The body 7 is also provided with four upwardly and outwardly extending milk receiving tubes 23. The upper ends of the tubes 23 may be beveled as indicated in the drawings, to facilitate the closing of the tubes 23.

The upper portion of the milk claw 1, designated as a whole by the reference character 40, is provided with four air tubes 22. These air tubes 22 connect to the teat cups 3 by means of air hoses 5 through the upper chamber 41 of the upper portion 40 and through the air inlet 30 by suitable means, such as a tube 42, to a pulsator 8.

The upper portion 40 of the milk claw 1 also includes a vertically disposed piston valve 26, air passage 25, atmospheric pressure inlet passage 28, piston seat 27, a suitable rubber ring 21 and a lid 20 adapted to fit securely over the upper portion 40 encircled and sealed by the rubber ring gasket 21. The air inlet 30 connected to the pulsator 8 delivers alternating vacuum and atmospheric pressure as a result of the action of the pulsator 8 and relays this pressure through the chamber 41, into the passage 25. The atmospheric air inlet passage 28 allows the air to enter into the chamber 6 containing the milk.

In order to explain in detail the operation of this piston 26 with regard to the milk claw 1, it is necessary to understand that the pulsator 8, by means of regulated air pressure and vacuum, causes the squeezing of the inflation members (not shown) located in the teat cups 3. In the instant that the pulsator 8 admits air pressure to act upon the inflation member of the teat cups 3, that is, when air enters the air inlet 30 and passes through the chamber 41, into the air tubes 22 connected to the teat cups 3 by suitable air hoses 5, to act upon the inflation member, this same air pressure passes from chamber 41 through the air passage 25 to act upon the piston 26, forcing the piston 26 to rest upon the valve shoulder or valve seat 27. With this action, the piston 26 is lowered, so that the lower end 24 (sufficiently larger than the opening 11 of the atmospheric air inlet passage 28) allows the air from the outside to enter the chamber 6 containing milk, through the atmospheric passage 28. Thus, the milk in the chamber 6 is forced through the milk passage 29 into the pipeline 32 through a suitable hose 31. It is to be understood that the cow is not delivering milk at this time.

When, through the operation of the pulsator 8, a vacuum is created in the teat cups 3, thus allowing the milk to leave the udders, a vacuum is likewise created through the passage 25. Because of the difference in the surface area between the head 33, operative in chamber 34, and head 24 operating in chamber 6, the vacuum raises the piston 26 from the valve shoulder 27 sufficiently so that the end portion 24, or head 24, of the piston 26 closes the opening 11 which comprises a valve seat, thus closing the atmospheric passage 28. As a result, no air from the outside enters the chamber 6 of the milk claw 1, when the teat gives off milk.

So it is seen, that through the construction of the milk claw 1, when the teats are not giving out milk, by means of additional atmospheric pressure, the milk located in the milk claw 1, is forced out through the outlet 29 through a suitable hose 31 into a pipeline 32. When a vacuum is created by the action of the pulsator 8, and the cow is in the milking state, the milk passes from the inflation members in the teat cups 3 through suitable hoses 4, through the milk inlets 23 and into the chamber 6 which maintains a normal vacuum at all times, which in turn is very desirable. The operation of this milk claw 1 does not effect the normal milking, regardless of the length and height of the milk tube within the operating limits of the machine. This milk claw 1 does not interfere with the normal vacuum in the teat cups 3 during the milking cycle, and also stops the agitation of the milk in the tubes. This normal vacuum maintained in the chamber 6 is due to the fact that as milk is constantly flowing from the chamber 6 into the pipeline 32, a partial vacuum is caused constantly within the chamber due to space being exhausted of any liquid therein. This vacuum is partially reduced each time that the piston opens the opening 11 to atmospheric pressure. As the atmospheric pressure enters the chamber, the additional pressure allows milk to flow into the pipeline. This partially exhausts the chamber, and, as the piston closes the opening 11, a vacuum is again created within the chamber. Thus it may be seen that by changing or varying the size of either or both of openings 11 or 28, the amount of air in the milk may be controlled.

While in the foregoing there has been shown and described the preferred embodiment of this invention, it is to be understood that minor changes in the details of construction, combination and arrangement of parts may be resorted to without departing from the spirit and scope of the invention as claimed. For example, the amount of air in the milk, may vary according to the size of the opening.

I claim:

1. A milk claw for use in a milking system including pulsator means, teat cup means and milk-collection means comprising a body including a milk chamber having an outlet for connection to said milk-collection means, milk-receiving means communicating with said milk chamber for connection to said teat cup means, a second chamber on said body including an inlet for connection to said pulsator means, conduit means communicating with said second chamber for connection to said teat cup means to communicate the variable pressure of said pulsator to said teat cup means, atmospheric pressure inlet passage means communicating with said milk chamber, and a valve in said body comprising a first valve portion in communication with and subject to pressures in said second chamber, a second valve portion in communication with and subject to pressures in said milk chamber, said atmospheric pressure inlet passage means communicating with said milk chamber between said valve portions, said second valve portion being interposed in valve relation between said atmospheric pressure inlet passage means and said milk chamber and operable with said first valve portion to alternately permit communication between said atmospheric pressure inlet passage means and said milk chamber in relation to alternating pressure in said second chamber from said pulsator, said first valve portion including a greater effective area than said second valve portion.

2. The structure of claim 1 including a third chamber on said body in communication with said second chamber.

3. The structure of claim 1 in which said body includes an elongated bore extending between said milk and third chambers, said atmospheric pressure inlet passage means communicates intermediately of said bore, said valve portions being located at opposite ends of said bore.

4. The structure of claim 3 including opposed valve seats at opposite ends of said bore, said valve comprises an elongated piston extending longitudinally of said bore, said piston including valve heads on opposite ends thereof respectively engageable with said valve seats.

5. The structure of claim 4 in which one valve head has a greater effective cross-sectional area than said other valve head.

References Cited in the file of this patent

UNITED STATES PATENTS

| | | |
|---|---|---|
| 784,780 | Burrell | Mar. 4, 1905 |
| 2,610,609 | Thomas | Sept. 16, 1952 |
| 2,694,380 | Harstick | Nov. 16, 1954 |
| 2,777,420 | Schilling | Jan. 15, 1957 |

FOREIGN PATENTS

| | | |
|---|---|---|
| 18,827 | Australia | Mar. 11, 1930 |
| 181,463 | Austria | Mar. 25, 1955 |